United States Patent [19]

Enomoto

[11] 4,305,191

[45] Dec. 15, 1981

[54] SQUEEZE ROLL ADAPTED TO ADJUST WIDTHWISE DISTRIBUTION OF PRESSURE ON CLOTH BEING TREATED

[76] Inventor: Shozo Enomoto, No. 450, Nakafusa, Iwade-cho, Naga-gun, Wakayama-ken, Japan

[21] Appl. No.: 911,149

[22] Filed: May 31, 1978

[51] Int. Cl.³ .............................................. B21B 13/02
[52] U.S. Cl. ............................................... 29/116 AD
[58] Field of Search .......... 29/117, 113 AD, 116 AD, 29/123, 125, 113 R, 122, 124, 126, 129.5

[56] References Cited

U.S. PATENT DOCUMENTS

| | | | |
|---|---|---|---|
| 763,251 | 6/1904 | Breck | 29/117 |
| 1,568,334 | 1/1926 | Hubbard | 29/117 |
| 3,225,418 | 12/1965 | Fara | 29/116 AD X |
| 3,840,958 | 10/1974 | Mahn | 29/116 AD X |
| 3,879,827 | 4/1975 | Lehmann | 29/116 AD |
| 4,068,360 | 1/1978 | Freuler | 29/116 AD |
| 4,089,094 | 5/1978 | Kaira | 29/116 AD |

FOREIGN PATENT DOCUMENTS

| | | | |
|---|---|---|---|
| 219460 | 12/1958 | Australia | 29/117 |
| 475372 | 4/1929 | Fed. Rep. of Germany | 29/117 |
| 525491 | 5/1931 | Fed. Rep. of Germany | 29/117 |

*Primary Examiner*—Wayne L. Shedd
*Attorney, Agent, or Firm*—Armstrong, Nikaido, Marmelstein & Kubovcik

[57] ABSTRACT

A squeeze roll for squeezing liquid from cloth being treated in a spread state. The squeeze roll is adapted to suitably adjust the widthwise distribution of the squeeze effect on the cloth, according to the need.

7 Claims, 7 Drawing Figures ($P < P_0$)

($P = P_0$)

($P > P_0$)

SQUEEZE ROLL ADAPTED TO ADJUST WIDTHWISE DISTRIBUTION OF PRESSURE ON CLOTH BEING TREATED

BACKGROUND OF THE INVENTION (a) Field of the Invention

The present invention relates to a squeeze roll for squeezing liquid from cloth being treated in a spread state.

The function of such squeeze rolls is dual; to provide uniformity in the squeeze effect and a high rate of squeeze of liquid. The invention is concerned with uniformity in the squeeze effect.

(b) Description of the Prior Art

Generally, when cloth is passed between rolls which squeeze liquid therefrom, it is desirable to press the cloth as uniformly as possible over the entire width of the cloth.

To this end, it is necessary that the pressure distribution between the rolls be maintained uniform over the entire width of the rolls.

Squeeze rolls heretofore used in general tend to deflect during the pressure loading in such a manner that their middle portions are displaced away from each other with a higher pressure exerted on the opposite ends of each roll, so that it has been impossible to attain uniformity in the squeeze effect.

In order to eliminate this drawback, there has already been proposed uniformly squeezing roll as shown in FIG. 1, which comprises a support shaft 1 and a cylindrical tube 2 fixed to said support shaft at the middle portion thereof.

In the squeeze roll shown in FIG. 1, if the length l of the middle fixing portion along which the support shaft 1 and cylindrical tube 2 are fixed together is designed to have a suitable value a, the cylindrical tube 2 will not substantially deflect during the pressure loading (refer to a line A in FIG. 2), so that a uniform pressure distribution can be attained over the entire width of a rubber cover 3.

If the length l of the fixing portion is designed to have a greater value than a, the deflection of the cylindrical tube 2 approaches the deflection line D of the support shaft 1 (refer to a line B in FIG. 2), resulting in the middle portion being pressurized less strongly than the opposite ends (i.e., the selvage-weighted state), the squeeze effect being such that the widthwise distribution of moisture content of the squeezed cloth is in the center-deepened state.

Conversely, if the length l of the fixing portion is designed to have a value smaller than a, the deflection of the cylindrical tube 2 resembles a line C in FIG. 2 which is curved opposite to the deflection line D of the support shaft 1, resulting in the central portion being pressurized more strongly than the opposite ends (i.e., the center-weighted state), the squeeze effect being such that the widthwise distribution of moisture content of the squeezed cloth is in the center-lightened state.

In this way, the deflection line of the cylindrical tube 2 varies according to the length l of the fixing portion. Under these circumstances, however, once the length l is determined and the roll produced, it is no longer possible to change the deflection line of the cylindrical tube 2 and hence the nature or pattern of the distribution of pressure on the squeeze roll.

For example, supposing l=a, a uniform pressure distribution can be attained over the entire width of the roll irrespective of the magnitude of the pressure exerted thereon. This uniformity in pressure distribution, however, can be ensured only on condition that the cloth being passed has a width substantially equal to the roll width or that the cloth is sufficiently thin in thickness and the rubber cover 3 has sufficient elasticity. If, therefore, cloth whose width is much narrower than the roll width and which is relatively thick is passed, it does not necessarily follow that the above mentioned uniformity can be attained.

Further, in some dyeing processes, even if the uniformity is secured by the squeeze rolls in the preceding process, it frequently happens that the final finish on the cloth is not uniform widthwise thereof owing to nonuniformity in the drying or steaming treatment in the subsequent processes.

In such cases, the squeeze roll of FIG. 1 described above has the disadvantage of being incapable of optionally adjusting the distribution of the squeeze effect.

SUMMARY OF THE INVENTION

An object of the present invention is to provide a squeeze roll adapted to optionally adjust the widthwise distribution of the squeeze effect to such conditions of cloth as the quality of material, the structure, the width and the thickness and to the treating conditions existing before and after the squeezing process.

Another object of the invention is to provide a squeeze roll having an adjusting mechanism whereby the distribution of the squeeze effect can be simply adjusted.

A further object of the invention is to provide a squeeze roll having an adjusting mechanism whose responsive action is in exact proportion to a force applied thereto for the above-mentioned adjustment.

Another object of the invention is to provide a squeeze roll designed so that the bending stress produced in the squeeze roll by a force applied thereto is reduced by a force applied to the above-mentioned adjusting mechanism.

Another object of the invention is to provide a squeeze roll which is capable of adjusting the widthwise distribution of the squeeze effect and which is simple in construction and is independent as such, having no direct connection with the mangle type pressurising mechanism and its bearings and the mating roll, so that it can be easily used in place of the conventional mangle squeeze roll.

These and other objects and merits of the invention will become more apparent from the following description of embodiments of the invention.

DESCRIPTION OF THE PREFERRED EMBODIMENTS

Figure 3:
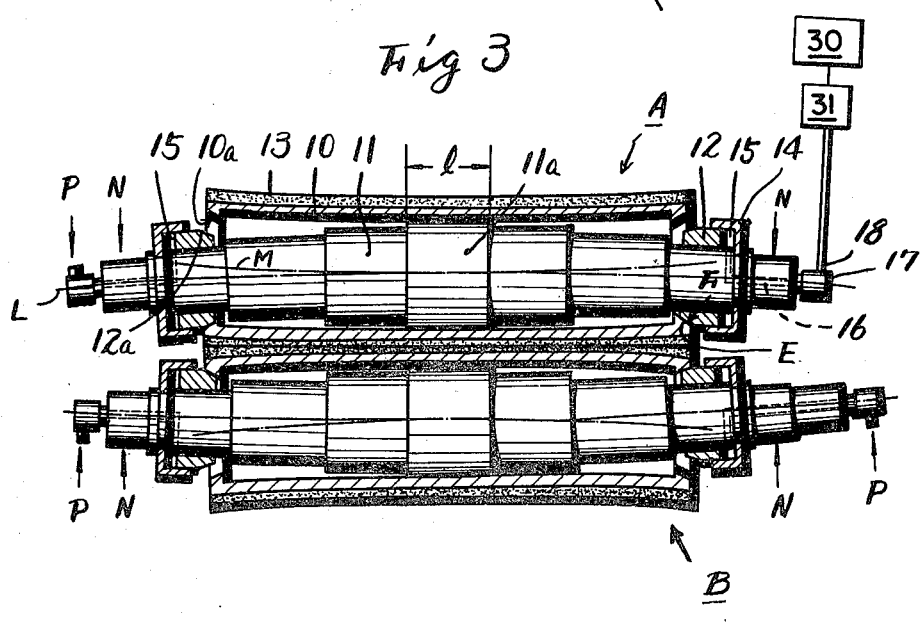
FIG. 3 is a sectional view of squeeze rolls according to an embodiment of the invention.

In FIG. 3, the characters A and B designate a pair of squeeze rolls, which are substantially of the same construction and adapted to adjust the squeeze effect in accordance with various conditions to cooperate with each other to squeeze liquid from cloth being treated in a spread state.

One squeeze roll A, as shown in FIG. 3, comprises a support shaft 11 supporting a cylindrical tube 10 at the middle portion thereof and conical pistons 12 at the opposite ends of said support shaft.

The support shaft 11 has a large diameter portion 11a in the middle and the cylindrical tube 10 is force-fitted on said large diameter portion 11a and fixed in position by set screws (not shown).

The outer periphery of said cylindrical tube 10 is fitted with a rubber cover 13.

The conical pistons 12 are slidable on the support shaft 11 within cylinders 14.

The cylinders 14 are fixed on the support shaft 11. A pressure space 15 is defined between each cylinder 14 and the associated conical piston 12 and communicates with a pressure communication hole 16 formed in the associated end of the support shaft 11 and is connected to a pressure supply tube 18 through a rotary joint 17 coupled to the end of the support shaft 11. The pressure supply tube 18 is connected to a pressure supply source 30 through pressure setting means 31, though not shown in detail, the arrangement being such that a pressure set by said pressure setting means is supplied to the pressure space 15.

The conical piston 12 has a conical head 12a while the cylindrical tube 10 is provided with an interior conical guide 10a to cooperate with said conical head.

Figure 4:
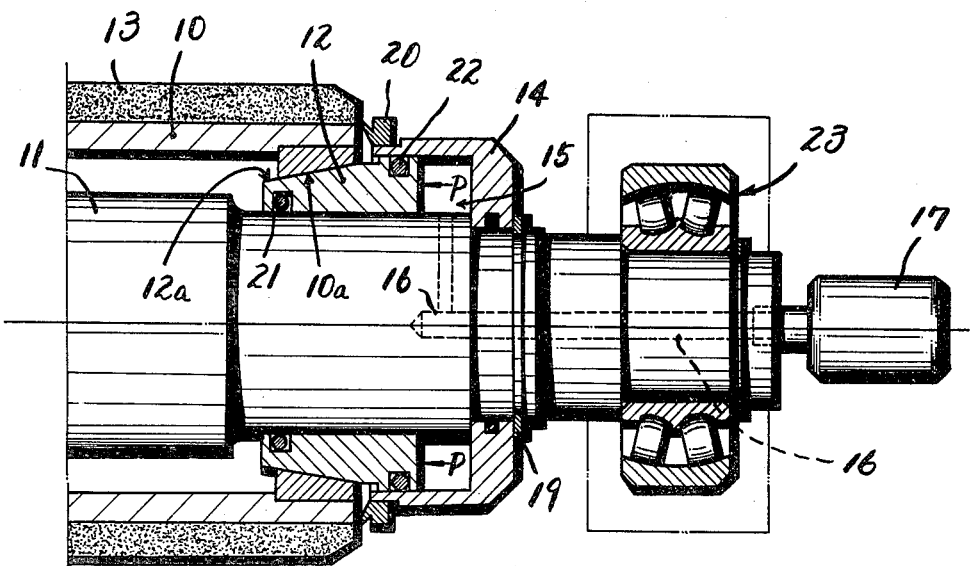
FIG. 4 is a partial enlarged view of the squeeze roll.

The interior conical guide 10a, as shown in FIG. 4, is formed separately from the cylindrical tube 10 and is fitted in the latter.

The cylinder 14, as shown in FIG. 4, is fixed against the shoulder of the support shaft 11 by a stop ring 19, and a sealing ring 20 of rubber is installed between the cylinder 14 and the cylindrical tube 10.

In addition, in FIG. 4, the numerals 21 and 22 designate O-ring packings installed in the piston 12.

The support shaft 11, as shown in FIG. 4, is supported at its opposite ends by spherical roller bearings 23.

Figure 1:
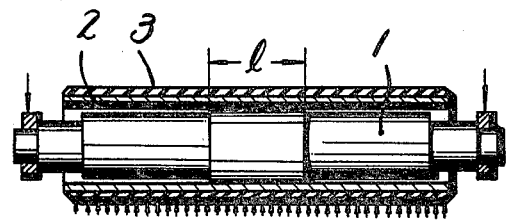
FIG. 1 is a sectional view of a conventional uniformly squeezing roll.
Figure 2:
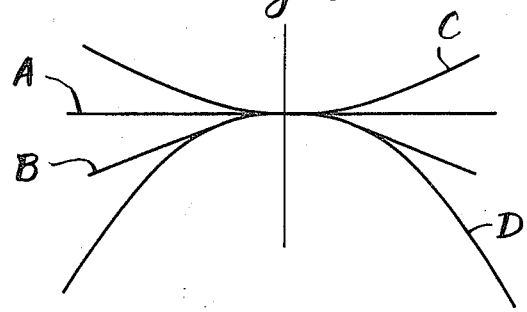
FIG. 2 is a diagram showing the deflection lines of rolls on an enlarged scale.

The length l of the fixing portion along which the support shaft 11 and the cylindrical tube 10 are fixed together is designed to be smaller than the value a so that the deflection line of the cylindrical tube 10 is like a line C in FIG. 2.

More particularly, it is so designed that, as shown in FIG. 3, the distribution of pressure on the rubber cover 13 is such that the central portion is subjected to a higher pressure than the opposite ends.

When the pair of squeeze rolls constructed in the manner described above are subjected to a pressure N through the bearings 23, they are deflected in such a manner that the center lines L of the support shafts 11 have their opposite ends drawn toward each other while the center lines M of the cylindrical tubes 10 have their opposite ends drawn away from each other.

That is, the center lines L and M of the support shafts 11 and cylindrical tubes 10, respectively, are deflected in mutually opposite directions, and these center lines are slightly offset from each other at their opposite ends.

It is to be noted that in this condition, fluid pressure (e.g., pneumatic or hydraulic pressure) is not yet applied to the spaces 15 in the cylinders, so that the squeeze effect provides said center-lightened state.

When fluid pressure is applied through the pressure supply tubes 18, the rotary joints 17 and the pressure communication holes 16, the fluid pressure P in the pressure spaces 15 is increased, thus forcing the conical pistons 12 inwardly along the support shafts 11 until the conical heads 12a are contacted with the interior conical guides 10a. In this case, however, since the center lines L and M are slightly offset from each other, such contact takes place at a contact point E on the nip side, with a clearance produced on the other side.

Therefore, a contact force F proportional to the pressure P is exerted toward the nip, so that the deflection of the cylindrical tube 10 is curved in the reverse direction. That is, when the pressure P reaches a suitable value Po, the deflections of the cylindrical tubes 10, i.e., of the squeeze rolls A and B become zero (refer to FIG. 5b), so that a uniform distribution of pressure is attained over the entire width of the rolls A and B and the nip width becomes uniform, as shown in FIG. 5b', thus providing a uniform squeeze effect.

Figure 5:
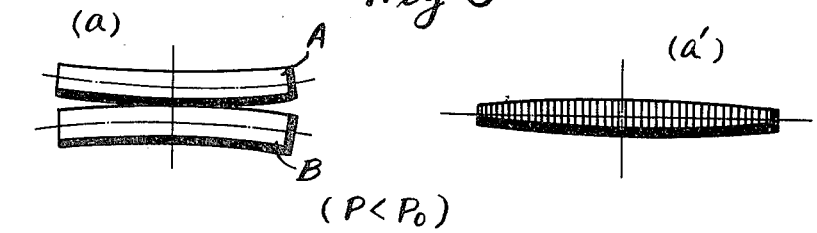
FIG. 5 is a view showing how the pressurized state of the squeeze rolls of the invention and the squeeze effect thereof will change.
Figure 5:
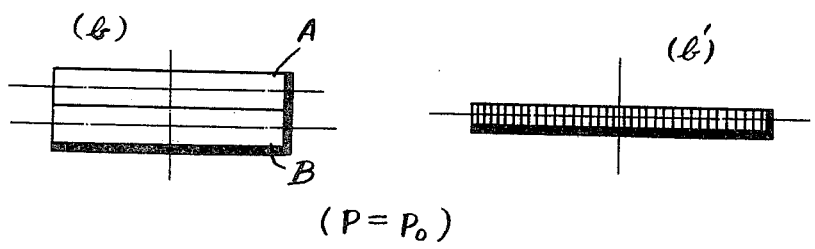
Figure 5:
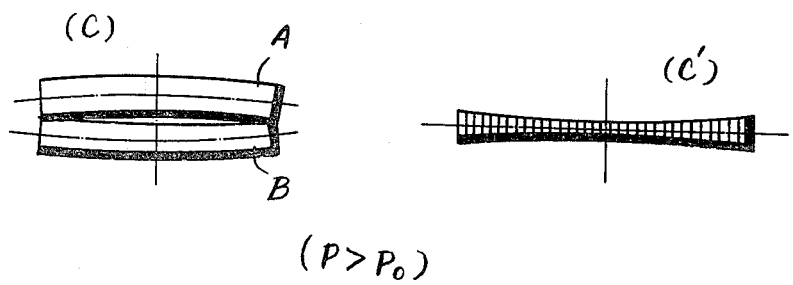

However, when the pressure P is lower than Po, the deflections of the squeeze rolls A and B are as shown in FIG. 5a, so that the nip width is as shown in FIG. 5a and hence the squeeze effect provides said center-lightened state.

If the pressure P is increased to exceed the value Po, then the conical pistons 12 are more deeply thrusted, so that the nip width is as shown in FIG. 5c and hence the squeeze effect provides said center-deepened state.

In this case, if the rolls A and B are at rest, the conical heads 12a are brought into wedge-fashion contact with the interior conical guides 10a, so that the conical pistons 12 become lacking in restorability.

However, when the rolls A and B are rotating, since the circumferential length of the conical head 12a at the contact point is slightly shorter than the circumferential length of the interior conical guide 10a, the contact point E is brought into a rolling contact state, and at the same time the conical piston 12 executes a slight amount of differential motion around the axis of the support shaft 11. Thus, all the resistances to slide motion at the contact point E and the fitting region between the piston and the cylinder 14 are eliminated concurrently with the rotation, thereby enabling the back and forth movement of the piston 12 to be effected smoothly.

In such rotating state, the contact force F acts on the contact point E in exact proportion to the fluid pressure P, so that the restorability is secured.

In this way, the deflection lines of the rolls A and B can be optionally changed by adjusting the fluid pressure P.

As is clear from the above description, the squeeze roll according to the present invention is adapted to adjust the distribution of the squeeze effect to such conditions of cloth as the quality of material, the structure, the width and the thickness and to the treating conditions existing before and after the squeezing process. As a result, the deflection line of the roll can be optionally adjusted, which is very effective in the attainment of a uniform final finish.

Viewed in the light of strength design, the maximum bending stress will generally be produced in the fixing portion, but such stress tends to be reduced as the fluid pressure is increased, which is favorable from the standpoint of the strength of materials.

Further, the squeeze roll is simple in construction and is an independent unit, having no direct connection with the conventional mangle type pressurizing mechanism and its bearings and the mating roll, so that it can be easily used in place of the conventional mangle type squeeze roll.

Figure 6:
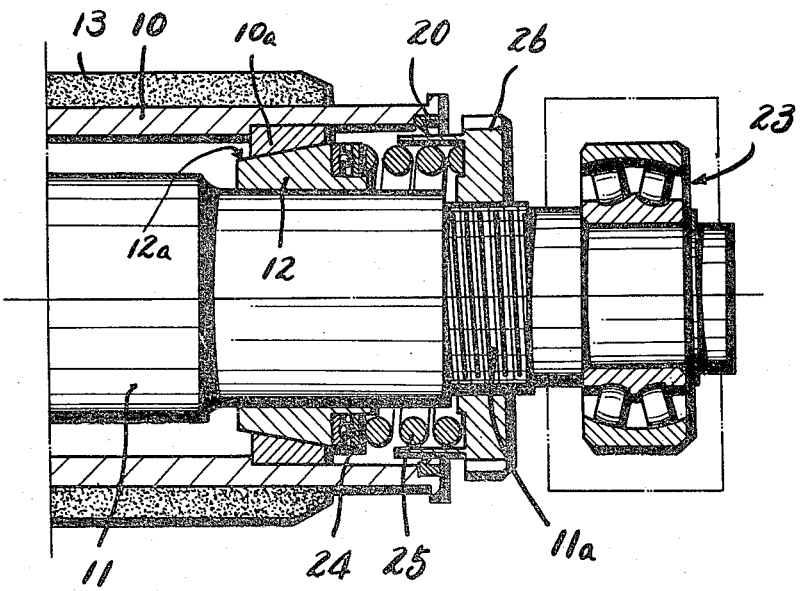
FIGS. 6 and 7 are sectional views of the principal portions of squeeze rolls according to other embodiments of the invention.

In the embodiment described above, cylinders 14 have been provided as thrust means and a fluid pressure has been used. However, they may be replaced by resilient means, such as a spring. For example, as shown in FIG. 6, a compression spring 25 is disposed on the back of the piston 12 with a thrust bearing 24 interposed therebetween, the resilient force of the spring being 25 rendered adjustable by means of an adjusting ring 26.

The adjusting ring 26 is threadedly engaged with a threaded portion 11a formed on the support shaft 11 adjacent the end of the latter.

Figure 7:
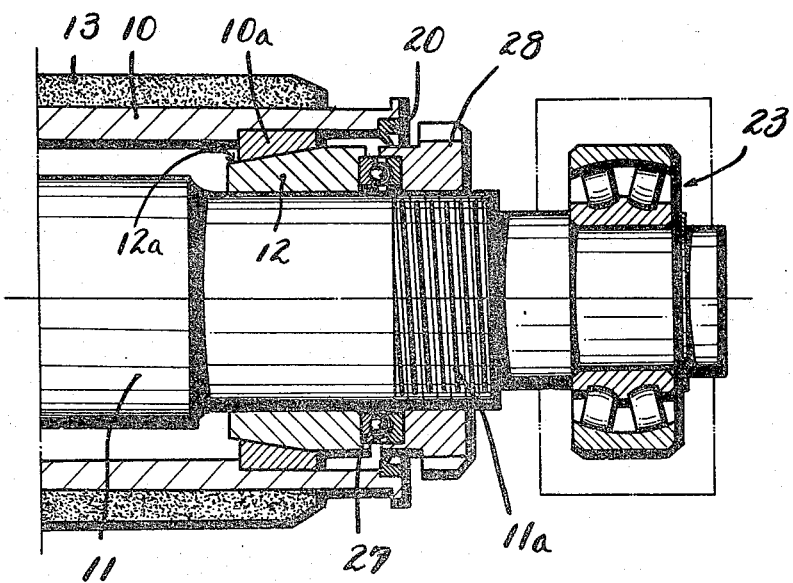

Further, the invention may also be embodied by using adjusting means for finely adjusting the position of the conical piston 12. For example, as shown in FIG. 7, an adjusting ring 27 is disposed on the back of the piston 12 with a thrust bearing 28 interposed therebetween, said adjusting ring 28 being threadedly engaged with a threaded portion formed on the support shaft 11 adjacent the end of the latter, so that adjustments can be made by rotating the adjusting ring 28. In order to facilitate the adjustment, part of the adjusting ring 28 may be provided with an index and graduations may be cut in the cylindrical tube 10 around the entire periphery of the end surface thereof. (This may also be applied to FIG. 6.)

Numerous modifications and variations of the present invention are, of course, possible within the scope and spirit of the invention.

What is claimed is:

1. A squeeze roll adapted to adjust the widthwise distribution of pressure, comprising a support shaft journaled at its opposite ends having a shaft axis with ends, a cylindrical tube coaxially fixed to said support shaft at the central portion thereof having a tube axis with ends, conical pistons having conical heads and rotatably and slidably mounted on opposite ends of said shaft, interior conical guide members formed on the inner surface of said cylindrical tube at the opposite ends thereof and adapted to be contacted with the conical heads of said pistons, and thrust means mounted on the opposite ends of said support shaft for imparting an axially adjustable force to said pistons, the arrangement being such that said shaft axis ends are offset from said tube axis ends and the pressure of contact between said conical heads and said conical guide members is adjustable whereby said conical pistons eccentrically load said guide members, thereby bending said tube.

2. A squeeze roll as set forth in claim 1, characterized in that said thrust means use fluid pressure as a pressure source.

3. A squeeze roll as set forth in claim 1 or 2, characterized in that said thrust means use fluid pressure and are provided with means capable of adjusting the fluid pressure being supplied.

4. A squeeze roll as set forth in claim 1 or 2, characterized in that said thrust means use fluid pressure and are provided with means capable of adjusting the fluid pressure being supplied and comprise a combination of a piston and a cylinder.

5. A squeeze roll as set forth in claim 4, characterized in that the cylinder combined with the piston has a pressure receiving space to which fluid pressure is supplied through a communication hole in the support shaft from a rotary joint installed at the end of the support shaft.

6. A squeeze roll as set forth in claim 1, characterized in that said thrust means comprise resilient means, such as a spring, and resilient force adjusting means.

7. A squeeze roll as set forth in claim 1, characterized in that said thrust means have adjusting means for finely adjusting the axial position of the piston.

* * * * *